(12) United States Patent
Sugahara et al.

(10) Patent No.: US 6,636,617 B1
(45) Date of Patent: Oct. 21, 2003

(54) METHOD AND APPARATUS FOR INSERTING AND EXTRACTING WATERMARK INTO AND FROM CONTENTS INFORMATION

(75) Inventors: Takayuki Sugahara, Yokosuka (JP); Joji Naito, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 587 days.

(21) Appl. No.: 09/584,081

(22) Filed: Jun. 1, 2000

(30) Foreign Application Priority Data

Jul. 16, 1999 (JP) .......................................... 11-202729

(51) Int. Cl.[7] .................................................. G06K 9/00
(52) U.S. Cl. ....................................... 382/100; 382/168
(58) Field of Search ............................... 382/100, 168, 382/167, 172, 221, 299; 358/3.28

(56) References Cited

U.S. PATENT DOCUMENTS

| 5,093,871 A | * | 3/1992 | Klein et al. ................. 382/172 |
| 5,727,092 A | * | 3/1998 | Sandford et al. ........... 382/251 |
| 5,926,578 A | * | 7/1999 | Fukase et al. .............. 382/266 |
| 5,930,369 A | | 7/1999 | Cox et al. ..................... 380/54 |
| 5,999,279 A | * | 12/1999 | Kouzaki et al. ............. 358/520 |
| 6,065,119 A | * | 5/2000 | Sandford et al. ........... 713/200 |
| 6,442,284 B1 | * | 8/2002 | Gustafson et al. .......... 382/100 |

FOREIGN PATENT DOCUMENTS

| EP | 0 845 757 A | 6/1998 |
| EP | 0 993 194 A | 4/2000 |
| GB | 0 859 337 A | 8/1998 |
| JP | 9-191394 | 7/1997 |
| JP | 2000-059743 | * 2/2000 ............ H04N/7/08 |
| WO | WO 89 08915 A | 9/1989 |

OTHER PUBLICATIONS

Swanson M D et al. "Multiresolution Scene–Based Video Wartermarking Using Perceptual Models" May 1, 1998.
Swanson M D et al. "Multiresolution Video Watermarking Using Perceptual Models and Scene Segmentation" Oct. 1997.
Swanson M D et al. "Robust Audio Watermarking Using Perceptual Masking" May 28, 1998.
Boney L., Tewfik A Hamdy K, "Digital Watermarks for Audio Signals" Jun. 23, 1996.
Swanson M D et al. "Current State of the Art, Challenges and Future Directions for Audio Watermarking" Jun. 7, 1999.
"A Copyright Information Embedding Method Using DCT for Digital Movies" by H. Ogawa et al., NTT Human Interface Laboratories; The 1997 Symposium on Cryptography and Information Security; Fukuoka, Japan, Jan. 29–Feb. 1, 1997; The Institute of Electronics,Information and Communication Engineers.

* cited by examiner

Primary Examiner—Leo Boudreau
Assistant Examiner—Shefali Patel
(74) Attorney, Agent, or Firm—Louis Woo

(57) ABSTRACT

In a method of inserting watermark information into digital data, a specified data value is determined in response to the watermark information. A data-value occurrence-frequency distribution of a predetermined number of samples of the digital data is changed into a modified occurrence-frequency distribution in which the specified data value occurs at a frequency extremely different from frequencies of occurrence of data values other than the specified data value.

14 Claims, 9 Drawing Sheets

| | e | f | | |
|---|---|---|---|---|
| | 20 | 21 | 22 | 23 |
| h | 21 | 20 | 20 | 21 |
| | 22 | 21 | 21 | 20 |
| | | i | | |

FIG. 5

| 18 | 18 | 25 | 23 |
|---|---|---|---|
| 24 | 16 | 18 | 18 |
| 21 | 21 | 23 | 20 |

METHOD AND APPARATUS FOR INSERTING AND EXTRACTING WATERMARK INTO AND FROM CONTENTS INFORMATION

BACKGROUND OF THE INVENTION

1. Field of the Invention

This invention relates to a method and an apparatus for inserting a watermark into contents information. In addition, this invention relates to a method and an apparatus for extracting a watermark from watermarked contents information.

2. Description of the Related Art

U.S. Pat. No. 5,930,369 (corresponding to Japanese published unexamined patent application 9-191394) discloses digital watermarking of audio, image, video or multimedia data which is achieved by inserting the watermark into the perceptually significant components of a decomposition of the data in a manner so as to be visually imperceptible. Specifically, U.S. Pat. No. 5,930,369 discloses a method in which a frequency spectral image of the data, preferably a Fourier transform of the data, is obtained, and a watermark is inserted into perceptually significant components of the frequency spectral image. The resultant watermarked spectral image is subjected to an inverse transform to produce watermarked data. The watermark is extracted from watermarked data by first comparing the watermarked data with the original data to obtain an extracted watermark. Then, the original watermark, original data and the extracted watermark are compared to generate a watermark which is analyzed for authenticity of the watermark.

In U.S. Pat. No. 5,930,369, the Fourier transform and the inverse transform cause a reduction in the cost performance ratio of the method.

H. Ogawa et al., "A Copying Information Embedding Method using DCT for Digital Movies", in SCIS'97-31G, have reported watermarking methods which are suitable for MPEG bit streams. The methods are based on modifying DCT coefficients, motion vectors, and quantizer matrices.

It is assumed that data which have been watermarked by one of the methods reported by H. Ogawa et al. are subjected to affine transformation to slightly rotate or distort a picture. It tends to be difficult to accurately extract the watermark from the transformation-resultant watermarked data.

International patent application WO 89/08915 discloses a method of inserting an identification string into a digital audio signal by substituting the "insignificant" bits of randomly selected audio samples with the bits of an identification code. The method in application WO 89/08915 can also be applied to coding schemes which do not have a defined word structure, such as delta modulation, in which case digits can be replaced completely randomly without regard to relative significance.

In the case of access to a portion of a digital audio signal into which an identification string has been inserted by the method in application WO 89/08915, it is difficult to recover (reproduce) the whole of the identification string if at least part of the identification string is in another portion of the digital audio signal.

SUMMARY OF THE INVENTION

It is a first object of this invention to provide an improved method of inserting a watermark into contents information.

It is a second object of this invention to provide an improved apparatus for inserting a watermark into contents information.

It is a third object of this invention to provide an improved method of extracting a watermark from watermarked contents information.

It is a fourth object of this invention to provide an improved apparatus for extracting a watermark from watermarked contents information.

A first aspect of this invention provides a method of inserting watermark information into digital data. The method comprises the steps of determining a specified data value in response to the watermark information; and changing a data-value occurrence-frequency distribution of a predetermined number of samples of the digital data into a modified occurrence-frequency distribution in which the specified data value occurs at a frequency extremely different from frequencies of occurrence of data values other than the specified data value.

A second aspect of this invention provides a method of inserting watermark information into digital data. The method comprises the steps of calculating differences between samples of the digital data to generate difference data representing the calculated differences; determining a specified difference data value in response to the watermark information; and changing a data-value occurrence-frequency distribution of a predetermined number of samples of the difference data into a modified occurrence-frequency distribution in which the specified difference data value occurs at a frequency extremely different from frequencies of occurrence of difference data values other than the specified difference data value.

A third aspect of this invention provides a method of inserting watermark information into digital data. The method comprises the steps of calculating differences between samples of the digital data to generate difference data representing the calculated differences; determining a specified difference data value in response to the watermark information; and changing a normalized data-value occurrence-frequency Laplace distribution of a predetermined number of samples of the difference data into a modified occurrence-frequency distribution in which the specified difference data value occurs at a frequency extremely different from frequencies of occurrence of difference data values other than the specified difference data value.

A fourth aspect of this invention provides a method of extracting watermark information from digital data. The method comprises the steps of detecting an occurrence-frequency distribution of data values in a predetermined number of samples of the digital data; detecting, from the detected occurrence-frequency distribution, a data value which occurs at a frequency extremely different from frequencies of occurrence of other data values; and reproducing the watermark information on the basis of the detected data value.

A fifth aspect of this invention provides a method of extracting watermark information from digital data. The method comprises the steps of calculating differences between samples of the digital data to generate difference data representing the calculated differences; detecting an occurrence-frequency distribution of difference data values in a predetermined number of samples of the difference data; detecting, from the detected occurrence-frequency distribution, a difference data value which occurs at a frequency extremely different from frequencies of occurrence of other difference data values; and reproducing the watermark information on the basis of the detected difference data value.

A sixth aspect of this invention provides a method of extracting watermark information from digital data. The method comprises the steps of calculating differences between samples of the digital data to generate difference data representing the calculated differences; detecting a normalized occurrence-frequency Laplace distribution of difference data values in a predetermined number of samples of the difference data; detecting, from the detected normalized occurrence-frequency Laplace distribution, a difference data value which occurs at a frequency extremely different from frequencies of occurrence of other difference data values; and reproducing the watermark information on the basis of the detected difference data value.

A seventh aspect of this invention provides an apparatus for inserting watermark information into digital data. The apparatus comprises means for determining a specified data value in response to the watermark information; and means for changing a data-value occurrence-frequency distribution of a predetermined number of samples of the digital data into a modified occurrence-frequency distribution in which the specified data value occurs at a frequency extremely different from frequencies of occurrence of data values other than the specified data value.

An eighth aspect of this invention provides an apparatus for inserting watermark information into digital data. The apparatus comprises means for calculating differences between samples of the digital data to generate difference data representing the calculated differences; means for determining a specified difference data value in response to the watermark information; and means for changing a data-value occurrence-frequency distribution of a predetermined number of samples of the difference data into a modified occurrence-frequency distribution in which the specified difference data value occurs at a frequency extremely different from frequencies of occurrence of difference data values other than the specified difference data value.

A ninth aspect of this invention provides an apparatus for inserting watermark information into digital data. The apparatus comprises means for calculating differences between samples of the digital data to generate difference data representing the calculated differences; means for determining a specified difference data value in response to the watermark information; and means for changing a normalized data-value occurrence-frequency Laplace distribution of a predetermined number of samples of the difference data into a modified occurrence-frequency distribution in which the specified difference data value occurs at a frequency extremely different from frequencies of occurrence of difference data values other than the specified difference data value.

A tenth aspect of this invention provides an apparatus for extracting watermark information from digital data. The apparatus comprises means for detecting an occurrence-frequency distribution of data values in a predetermined number of samples of the digital data; means for detecting, from the detected occurrence-frequency distribution, a data value which occurs at a frequency extremely different from frequencies of occurrence of other data values; and means for reproducing the watermark information on the basis of the detected data value.

An eleventh aspect of this invention provides an apparatus for extracting watermark information from digital data. The apparatus comprises means for calculating differences between samples of the digital data to generate difference data representing the calculated differences; means for detecting an occurrence-frequency distribution of difference data values in a predetermined number of samples of the difference data; means for detecting, from the detected occurrence-frequency distribution, a difference data value which occurs at a frequency extremely different from frequencies of occurrence of other difference data values; and means for reproducing the watermark information on the basis of the detected difference data value.

A twelfth aspect of this invention provides an apparatus for extracting watermark information from digital data. The apparatus comprises means for calculating differences between samples of the digital data to generate difference data representing the calculated differences; means for detecting a normalized occurrence-frequency Laplace distribution of difference data values in a predetermined number of samples of the difference data; means for detecting, from the detected normalized occurrence-frequency Laplace distribution, a difference data value which occurs at a frequency extremely different from frequencies of occurrence of other difference data values; and means for reproducing the watermark information on the basis of the detected difference data value.

A thirteenth aspect of this invention provides an apparatus for inserting watermark information into digital data. The apparatus comprises means for deriving differences between samples of the digital data; means for selecting at least one from among values, which differences between samples of the digital data can take, as a forbidden value in response to the watermark information; means for deciding whether or not the derived differences are equal to the forbidden value; and means for changing logic states of samples of the digital data which relate to the derived differences decided to be equal to the forbidden value to convert the digital data into conversion-resultant data to inhibit differences between samples of the conversion-resultant data from taking the forbidden value.

A fourteenth aspect of this invention provides an apparatus for extracting watermark information from digital data. The apparatus comprises means for deriving differences between samples of the digital data; means for detecting an occurrence-frequency distribution of values of the derived differences; means for comparing the detected occurrence-frequency distribution with a predetermined reference occurrence-frequency distribution to find a difference value whose detected occurrence frequency is smaller than its reference occurrence frequency by more than a given percentage; and means for reproducing the watermark information on the basis of the found difference value.

DESCRIPTION OF THE PREFERRED EMBODIMENTS

First Embodiment

Figure 1:
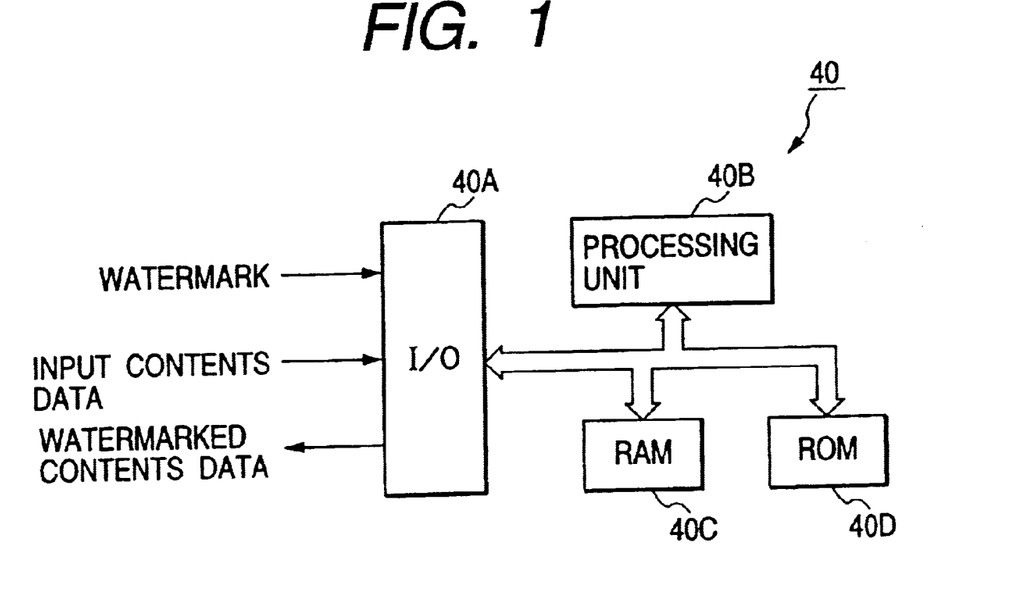
FIG. 1 is a block diagram of a watermark embedding apparatus (a watermark inserting apparatus) according to a first embodiment of this invention.

FIG. 1 shows a watermark embedding apparatus (a watermark inserting apparatus) according to a first embodiment of this invention. The apparatus in FIG. 1 includes a digital processing device 40 such as a signal processor or a computer. The digital processing device 40 has a combination of an input/output (I/O) port 40A, a processing unit 40B, a RAM 40C, and a ROM 40D. The digital processing device 40 operates in accordance with a program stored in the ROM 40D. The digital processing device 40 receives, via the I/O port 40A, input contents data (data representing contents information or main information) and a signal representing a digital watermark. The digital processing device 40 generates watermarked contents data or watermark-embedded contents data in response to the input contents data and the watermark signal. The digital processing device 40 outputs the watermark-embedded contents data via the I/O port 40A.

The input contents data are picture data such as luminance data, color data, or color-difference data. The input contents data have a sequence of samples corresponding pixels respectively. Each of the samples has a predetermined number of bits, for example, 8 bits. The watermark signal has a predetermined number of bits, for example, 3 bits.

Preferably, samples of the input contents data are separated into groups each having a predetermined number of samples, for example, 1024 samples. Preferably, the watermark signal is varied from sample group to sample group.

Figure 2:
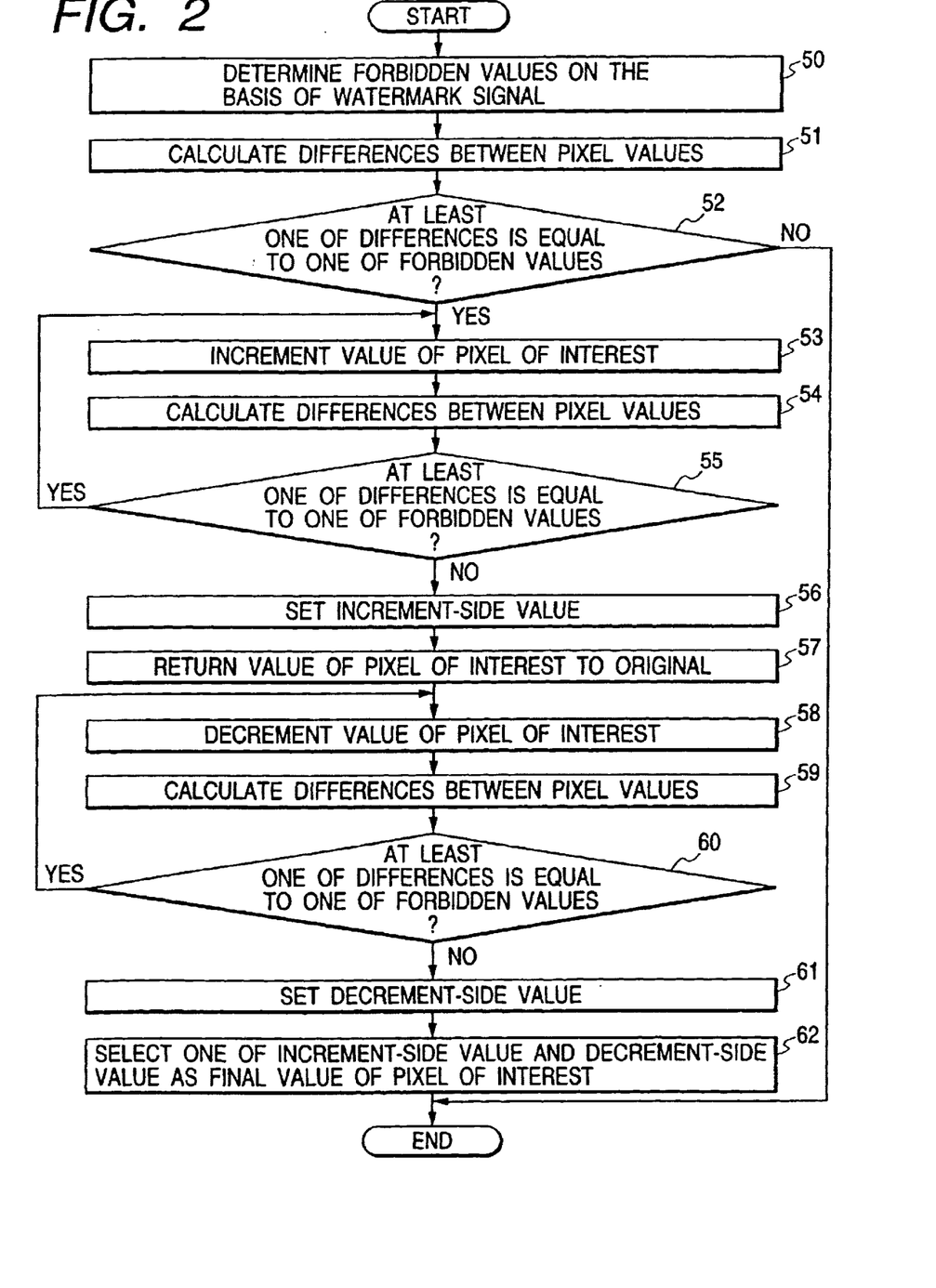
FIG. 2 is a flow diagram of operation of a digital processing device in FIG. 1.

FIG. 2 shows a flow of operation of the digital processing device 40 for every sample (every pixel) which is controlled by the program stored in the ROM 40D. With reference to FIG. 2, a block 50 determines forbidden values on the basis of the watermark signal. Logic states (levels) of the watermark signal are previously assigned to forbidden values. In the case where the watermark signal has 3 bits, first to eighth levels of the watermark signal are assigned to forbidden values "0", "±1", "±2", "±3", "±4", "±5", "±6", and "±7". Specifically, the first level of the watermark signal is assigned to the forbidden value "0". The second level of the watermark signal is assigned to the forbidden values "±1". The third level of the watermark signal is assigned to the forbidden values "±2". The fourth level of the watermark signal is assigned to the forbidden values "±3". The fifth level of the watermark signal is assigned to the forbidden values "±4". The sixth level of the watermark signal is assigned to the forbidden values "±5". The seventh level of the watermark signal is assigned to the forbidden values "±6". The eighth level of the watermark signal is assigned to the forbidden values "±7". A table indicating the assignment of the levels of the watermark signal to the forbidden values is provided in the ROM 40D. The block 50 determines the forbidden value or values by referring to the table in response to the watermark signal. After the block 50, the operation flow advances to a block 51.

Preferably, the watermark signal is designed to prevent the determined forbidden value or values from being equal to "0". In this case, the watermark signal takes any one of the levels except the first level.

Figure 3:
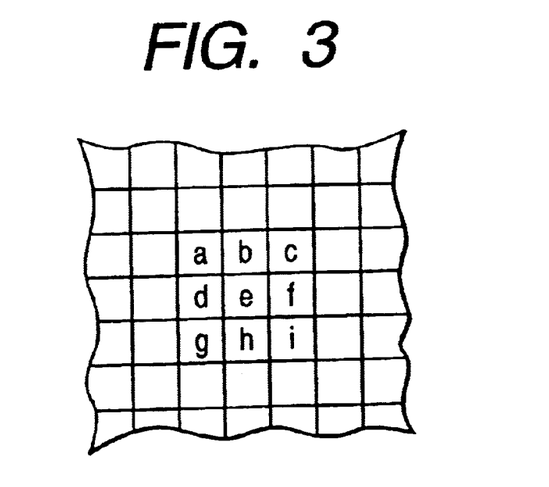
FIG. 3 is a diagram of pixel areas in a frame.

The block 51 accesses 9 samples of the input contents data which correspond to the pixel "e" of interest and 8 pixels "a", "b", "c", "d", "f", "g", "h", and "i" neighboring the pixel "e" of interest (see FIG. 3). The block 51 subtracts the value of the pixel "e" of interest from the value of the neighboring pixel "a", and hence calculates the pixel-value difference "a−e". The block 51 subtracts the value of the pixel "e" of interest from the value of the neighboring pixel "b", and hence calculates the pixel-value difference "b−e". The block 51 subtracts the value of the pixel "e" of interest from the value of the neighboring pixel "c", and hence calculates the pixel-value difference "c−e". The block 51 subtracts the value of the pixel "e" of interest from the value of the neighboring pixel "d", and hence calculates the pixel-value difference "d−e". The block 51 subtracts the value of the pixel "e" of interest from the value of the neighboring pixel "f", and hence calculates the pixel-value difference "f−e". The block 51 subtracts the value of the pixel "e" of interest from the value of the neighboring pixel "g", and hence calculates the pixel-value difference "g−e". The block 51 subtracts the value of the pixel "e" of interest from the value of the neighboring pixel "h", and hence calculates the pixel-value difference "h−e". The block 51 subtracts the value of the pixel "e" of interest from the value of the neighboring pixel "i", and hence calculates the pixel-value difference "i−e".

A block 52 following the block 51 decides whether or not at least one of the calculated pixel-value differences "a−e", "b−e", "c−e", "d−e", "f−e", "g−e", "h−e", and "i−e" is equal to one of the determined forbidden values. When at least one of the calculated pixel-value differences is equal to one of the determined forbidden values, the operation flow advances from the block 52 to a block 53. Otherwise, the operation flow ends. In this case, the sample of the input contents data which corresponds to the pixel "e" of interest is maintained as it is without being processed.

The block 53 increments the value of the pixel "e" of interest by "1". Specifically, the block 53 increments the value represented by the sample of the input contents data which corresponds to the pixel "e" of interest.

A block 54 subsequent to the block 53 is similar to the block 51. The block 54 calculates the pixel-value differences "a−e", "b−e", "c−e", "d−e", "f−e", "g−e", "h−e", and "i−e".

A block 55 following the block 54 is similar to the block 52. The block 55 decides whether or not at least one of the calculated pixel-value differences "a−e","b−e", "c−e", "d−e", "f−e", "g−e", "h−e", and "i−e" is equal to one of the determined forbidden values. When at least one of the calculated pixel-value differences is equal to one of the determined forbidden values, the operation flow returns from the block 55 to the block 53. Otherwise, the operation flow advances from the block 55 to a block 56.

Accordingly, the value of the pixel "e" of interest continues to be periodically incremented until all the calculated pixel-value differences "a–e", "b–e", "c–e", "d–e", "f–e", "g–e", "h–e", and "i–e" become different from the determined forbidden values.

The block 56 defines the value (the current value) of the pixel "e" of interest as an increment-side value.

A block 57 subsequent to the block 56 returns the value of the pixel "e" of interest to the original one. Specifically, the block 57 returns the value represented by the sample of the input contents data which corresponds to the pixel "e" of interest. After the block 57, the operation flow advances to a block 58.

The block 58 decrements the value of the pixel "e" of interest by "1". Specifically, the block 58 decrements the value represented by the sample of the input contents data which corresponds to the pixel "e" of interest.

A block 59 subsequent to the block 58 is similar to the block 51. The block 59 calculates the pixel-value differences "a–e", "b–e", "c–e", "d–e", "f–e", "g–e", "h–e", and "i–e".

A block 60 following the block 59 is similar to the block 52. The block 60 decides whether or not at least one of the calculated pixel-value differences "a–e", "b–e", "c–e", "d–e", "f–e", "g–e", "h–e", and "i–e" is equal to one of the determined forbidden values. When at least one of the calculated pixel-value differences is equal to one of the determined forbidden values, the operation flow returns from the block 60 to the block 58. Otherwise, the operation flow advances from the block 60 to a block 61.

Accordingly, the value of the pixel "e" of interest continues to be periodically decremented until all the calculated pixel-value differences "a–e", "b–e", "c–e", "d–e", "f–e", "g–e", "h–e", and "i–e" become different from the determined forbidden values.

The block 61 defines the value (the current value) of the pixel "e" of interest as a decrement-side value.

A block 62 subsequent to the block 61 selects one of the increment-side value and the decrement-side value. The block 62 sets the value of the pixel "e" of interest to the selected value. Specifically, the block 62 decides which of the increment-side value and the decrement-side value is closer to the original value of the pixel "e" of interest. The block 62 selects one of the increment-side value and the decrement-side value which is decided to be closer to the original value of the pixel "e" of interest. When the increment-side value and the decrement-side value are equidistant from the original value of the pixel "e" of interest, the block 62 selects the decrement-side value. After the block 62, the operation flow ends.

In this way, every sample of the input contents data is processed according to the flow operation in FIG. 2. A sample to be processed is shifted from one to another in a predetermined scanning direction on a raster. A sample of the input contents data which has been processed according to the flow operation in FIG. 2 forms a sample of the watermark-embedded contents data (the watermarked contents data).

Regarding the watermark-embedded contents data, the differences between the values of neighboring pixels hardly take the forbidden values determined in accordance with the watermark signal. Thus, a pixel-value difference equal to one of the determined forbidden values occurs at a very low frequency. On the other hand, pixel-value differences different from the determined forbidden values occur at frequencies remarkably higher than the frequency of the occurrence of the pixel-value difference equal to one of the determined forbidden values. Since the determined forbidden values depend on the watermark signal, a pixel-value difference equal to one of the determined forbidden values can be used as an indication of the watermark signal. In other words, the pixel-value difference equal to one of the determined forbidden values indicates the watermark signal embedded in the contents data. Accordingly, the watermark signal can be reproduced or recovered from the watermark-embedded contents data by searching pixel-value differences for a pixel-value difference which occurs at a very low frequency.

Figure 4:
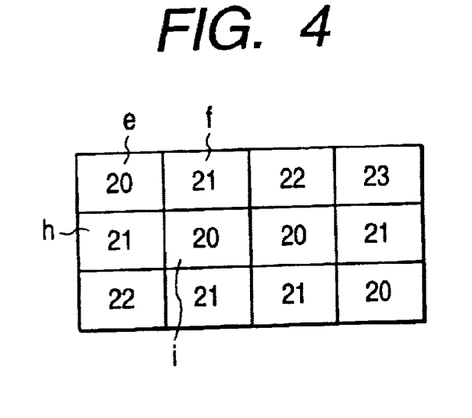
FIG. 4 is a diagram of an example of the values of adjacent pixels forming a left-upper corner of a frame.

FIG. 4 shows an example of the values of adjacent pixels forming a left-upper corner of a frame. The left-upper pixel is assumed to be a pixel "e" of interest. In FIG. 4, the value of the pixel "e" of interest is equal to "20". The values of pixels "f", "h", and "i" neighboring the pixel "e" of interest are equal to "21", "21", and "20" respectively. In this case, the pixel-value differences "f–e", "h–e", and "i–e" calculated by the block 51 in FIG. 2 are equal to "+1", "+1", and "0" respectively.

It is assumed that the determined forbidden values are equal to "±1". In this case, the block 52 in FIG. 2 decides that at least one of the pixel-value differences "f–e", "h–e", and "i–e" is equal to one of the determined forbidden values (±1). Therefore, the block 53 in FIG. 2 increments the value of the pixel "e" of interest from "20" to "21". Subsequently, the block 54 in FIG. 2 calculates the pixel-value differences "f–e", "h–e", and "i–e" which are equal to "0", "0", and "–1" respectively. Thus, the block 55 in FIG. 2 decides that at least one of the pixel-value differences "f–e", "h–e", and "i–e" is equal to one of the determined forbidden values (±1). Therefore, the block 53 in FIG. 2 increments the value of the pixel "e" of interest from "21" to "22". Subsequently, the block 54 in FIG. 2 calculates the pixel-value differences "f–e", "h–e", and "i–e" which are equal to "–1", "–1", and "–2" respectively. Thus, the block 55 in FIG. 2 decides that at least one of the pixel-value differences "f–e", "h–e", and "i–e" is equal to one of the determined forbidden values (±1). Therefore, the block 53 in FIG. 2 increments the value of the pixel "e" of interest from "22" to "23". Subsequently, the block 54 in FIG. 2 calculates the pixel-value differences "f–e", "h–e", and "i–e" which are equal to "–2", "–2", and "–3" respectively. Thus, the block 55 in FIG. 2 decides that all the pixel-value differences "f–e", "h–e", and "i–e" are different from the determined forbidden values (±1). In this case, the block 56 in FIG. 2 defines the value "23" of the pixel "e" of interest as the increment-side value.

Subsequently, the block 57 in FIG. 2 returns the value of the pixel "e" of interest to the original one. Then, the block 58 in FIG. 2 decrements the value of the pixel "e" of interest from "20" to "19". Next, the block 59 in FIG. 2 calculates the pixel-value differences "f–e", "h–e", and "i–e" which are equal to "+2", "+2", and "+1" respectively. Thus, the block 60 in FIG. 2 decides that at least one of the pixel-value differences "f–e", "h–e", and "i–e" is equal to one of the determined forbidden values (±1). Therefore, the block 58 in FIG. 2 decrements the value of the pixel "e" of interest from "19" to "18". Subsequently, the block 59 in FIG. 2 calculates the pixel-value differences "f–e", "h–e", and "i–e" which are equal to "+3", "+3", and "+2" respectively. Thus, the block 60 in FIG. 2 decides that all the pixel-value differences "f–e", "h–e", and "i–e" are different from the determined forbidden values (±1). In this case, the block 61 in FIG. 2 defines the value "18" of the pixel "e" of interest as the decrement-side value.

Since the decrement-side value "18" is closer to the original value "20" of the pixel "e" of interest than the increment-side value "23" is, the block 62 selects the decrement-side value "18". In addition, the block 62 sets the value of the pixel "e" of interest to the selected value, that is, the decrement-side value "18". In this way, the value of the pixel "e" of interest is changed from "20" to "18".

Figure 5:
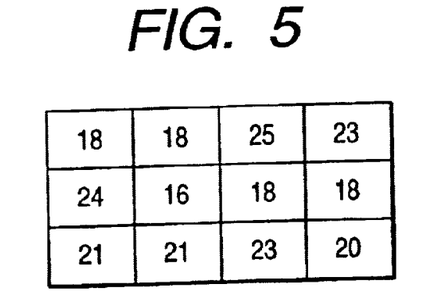
FIG. 5 is a diagram of the values of adjacent pixels which result from processing of the pixels in FIG. 4 according to the operation flow in FIG. 2.

FIG. 5 shows the values of adjacent pixels which result from processing of the pixels in FIG. 4 according to the operation flow in FIG. 2.

In some cases, the watermark-embedded contents data are subjected to a general compression process or a general low-pass filtering process. Even in these cases, the frequency of the occurrence of the pixel-value difference equal to one of the determined forbidden values is still low enough to accurately recover (reproduce) the watermark signal.

Second Embodiment

Figure 6:
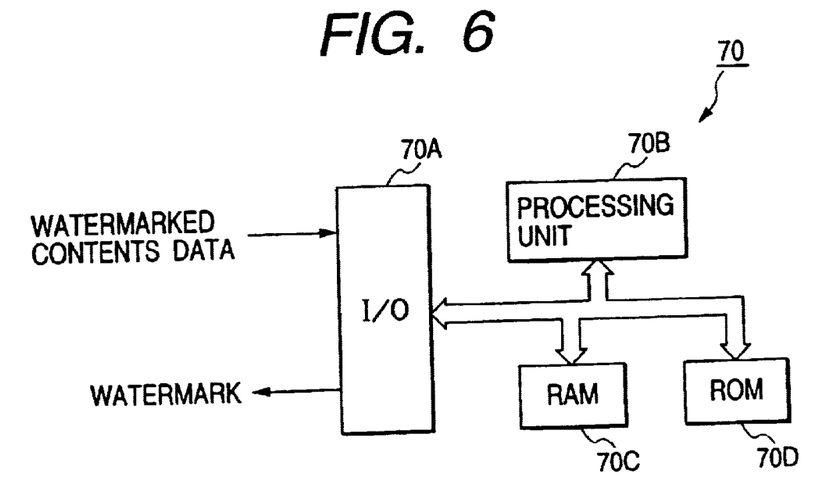
FIG. 6 is a block diagram of a watermark extracting apparatus according to a second embodiment of this invention.

FIG. 6 shows a watermark extracting apparatus according to a second embodiment of this invention. The apparatus in FIG. 6 includes a digital processing device 70 such. as a signal processor or a computer. The digital processing device 70 has a combination of an input/output (I/O) port 70A, a processing unit 70B, a RAM 70C, and a ROM 70D. The digital processing device 70 operates in accordance with a program stored in the ROM 70D. The digital processing device 70 receives, via the I/O port 70A, watermark-embedded contents data (watermarked contents data) generated by the apparatus in FIG. 1. The digital processing device 70 extracts or recovers (reproduces) a watermark signal from the watermark-embedded contents data. The digital processing device 70 outputs the extracted watermark signal via the I/O port 70A.

The watermark-embedded contents data are picture data such as luminance data, color data, or color-difference data. The watermark-embedded contents data have a sequence of samples corresponding pixels respectively. Each of the samples has a predetermined number of bits, for example, 8 bits. The watermark signal has a predetermined number of bits, for example, 3 bits.

Samples of the watermark-embedded contents data are separated into groups each having a predetermined number of samples, for example, 1024 samples. The watermark signal is varied from sample group to sample group.

Figure 7:
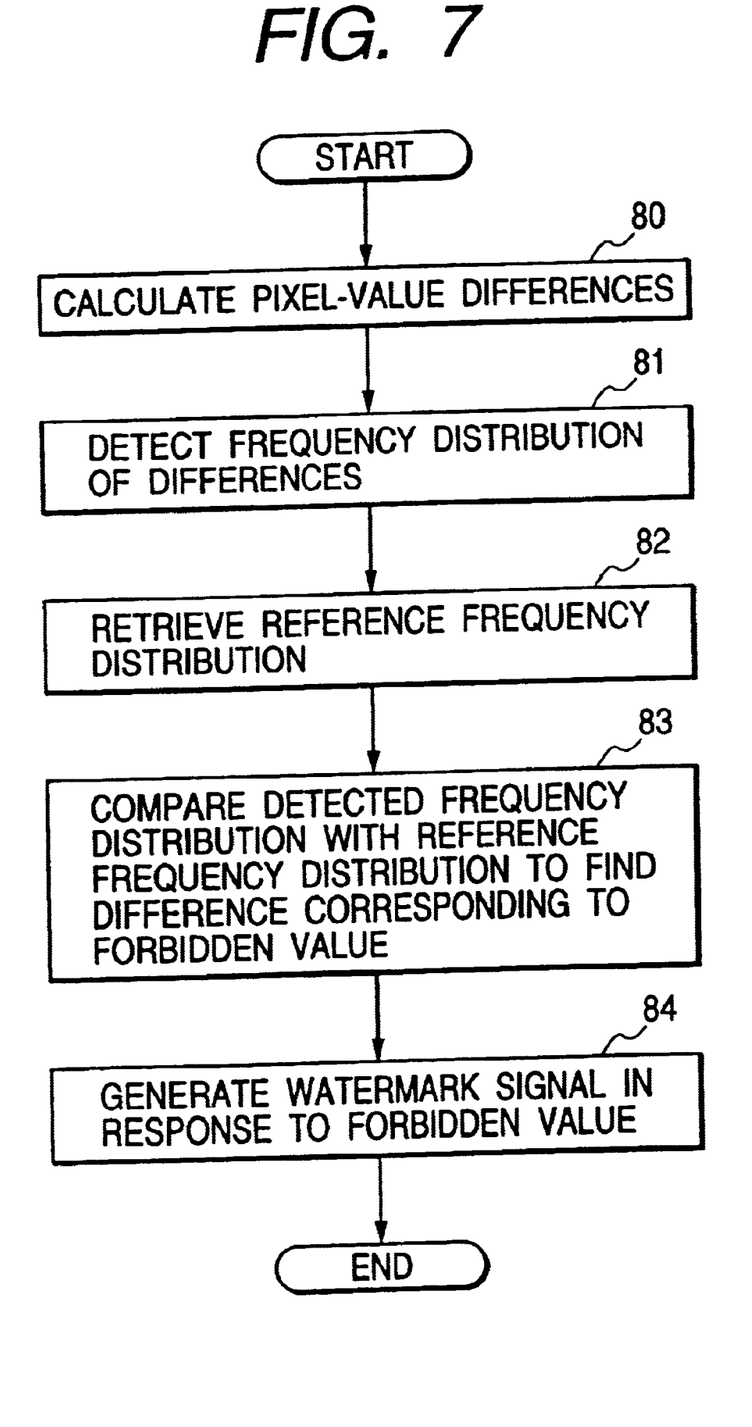
FIG. 7 is a flow diagram of operation of a digital processing device in FIG. 6.

FIG. 7 shows a flow of operation of the digital processing device 70 for every sample group which is controlled by the program stored in the ROM 70D. With reference to FIG. 7, a block 80 accesses a group of samples of the watermark-embedded contents data which correspond to pixels forming at least a part of a frame. The number of samples in the group is equal to, for example, 1024. The bock 80 calculates the differences between the values of neighboring pixels.

A block 81 following the block 80 calculates a normalized occurrence-frequency distribution of the calculated pixel-value differences. The calculated occurrence-frequency distribution is referred to as the detected occurrence-frequency distribution.

A block 82 subsequent to the block 81 retrieves a predetermined reference occurrence-frequency distribution of pixel-value differences. Specifically, information representing a typical occurrence-frequency distribution of pixel-value differences is stored in the ROM 70D. The typical occurrence-frequency distribution is, for example, an occurrence-frequency Laplace distribution. The typical occurrence-frequency distribution is referred to as the reference occurrence-frequency distribution. The block 82 reads the information of the reference occurrence frequency distribution from the ROM 70D.

A block 83 following the block 82 compares the detected occurrence-frequency distribution and the reference occurrence-frequency distribution in a limited range of pixel-value differences which can be equal to a watermark-related forbidden value in a 0-containing positive side or a 0-containing negative side. In the case where a watermark signal has 3 bits, the limited range extends from "0" to "+7" or from "−7" to "0". The comparison by the block 83 is to find a pixel-value difference whose detected occurrence frequency is lower than its reference occurrence frequency by more than a given percentage. Specifically, for every pixel-value difference in the detected occurrence-frequency distribution and the reference occurrence-frequency distribution in the limited range, the block 83 derives the detected occurrence frequency and the reference occurrence frequency from the detected occurrence-frequency distribution and the reference occurrence-frequency distribution respectively. Then, the block 83 compares the detected occurrence frequency and the reference occurrence frequency, and decides whether or not the detected occurrence frequency is lower than the reference occurrence frequency by more than the given percentage. The block 83 regards the found pixel-value difference as a detected forbidden value.

A block 84 subsequent to the block 83 generates a watermark signal in response to the detected forbidden value. Specifically, logic states (levels) of a watermark signal are previously assigned to forbidden values. In the case where the watermark signal has 3 bits, first to eighth levels of the watermark signal are assigned to forbidden values "0", "±1", "±2", "±3", "±4", "±5", "±6", and "±7". Specifically, the first level of the watermark signal is assigned to the forbidden value "0". The second level of the watermark signal is assigned to the forbidden values "±1". The third level of the watermark signal is assigned to the forbidden values "±2". The fourth level of the watermark signal is assigned to the forbidden values "±3". The fifth level of the watermark signal is assigned to the forbidden values "±4". The sixth level of the watermark signal is assigned to the forbidden values "±5". The seventh level of the watermark signal is assigned to the forbidden values "±6". The eighth level of the watermark signal is assigned to the forbidden values "±7". A table indicating the assignment of the levels of the watermark signal to the forbidden values is provided in the ROM 70D. The block 84 determines a watermark-signal level by referring to the table in response to the detected forbidden value. The block 84 generates a watermark signal in accordance with the determined level. After the block 84, the operation flow ends.

It is possible to accurately recover (reproduce) the watermark signal from only a part of the watermark-embedded contents data. Even in the case where the watermark-embedded contents data are processed to slightly rotate or distort a picture before the contents data are inputted into the apparatus of FIG. 6, the watermark signal can be accurately recovered from the inputted contents data.

Third Embodiment

Figure 8:
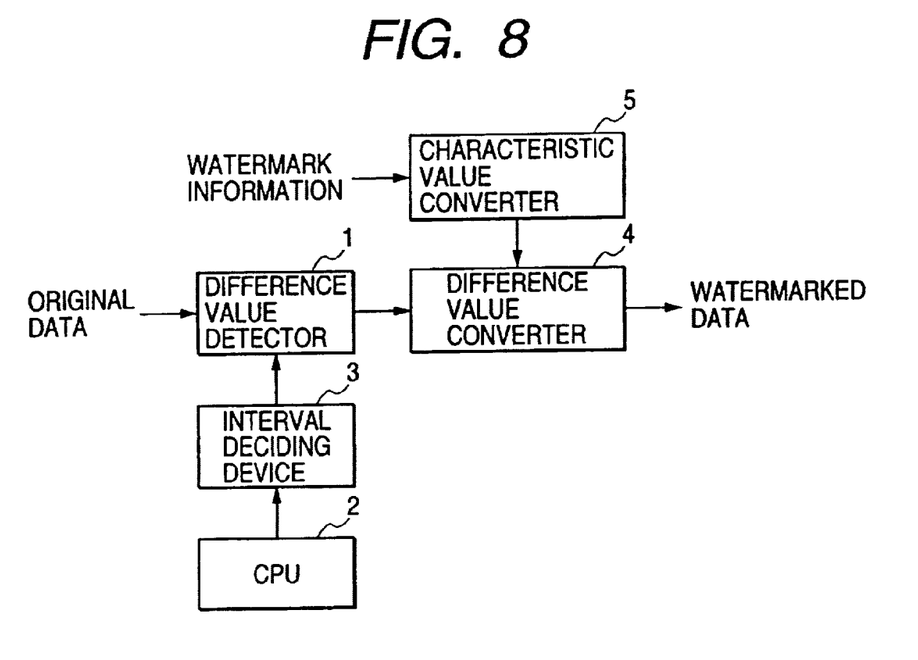
FIG. 8 is a block diagram of a watermark embedding apparatus (a watermark inserting apparatus) according to a third embodiment of this invention.

FIG. 8 shows a watermark embedding apparatus (a watermark inserting apparatus) according to a third embodiment of this invention. The apparatus in FIG. 8 includes a difference-value detector 1, a CPU 2, an interval deciding device 3, a difference-value converter 4, and a characteristic-value converter 5. The difference-value detector 1 is connected to the difference-value converter 4. The CPU 2 is connected to the interval deciding device 3. The interval deciding device 3 is connected to the difference-value detector 1. The characteristic-value converter 5 is connected to the difference-value converter 4.

Original data are inputted into the difference-value detector 1. The original data are picture data or audio data. The original data are formed by a sequence of samples. Preferably, samples of the original data are separated into groups each having 1024 samples.

Figure 9:
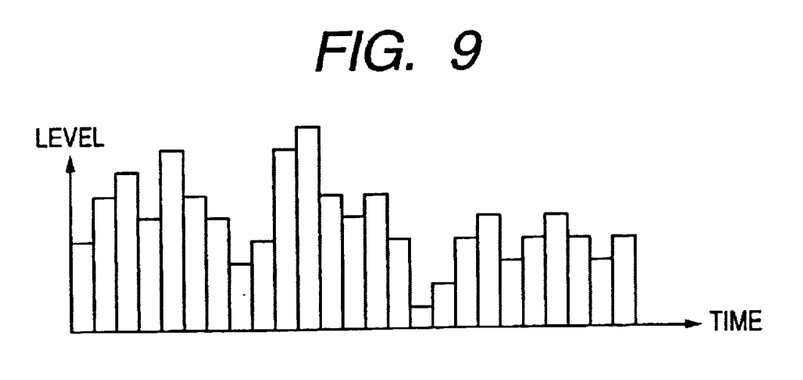
FIG. 9 is a time-domain diagram of an example of the levels represented by successive samples of original data.

In the case where the original data are audio data, the original data are formed by a sequence of 16-bit samples which result from sampling at a predetermined frequency. FIG. 9 shows an example of the levels represented by successive samples of the original data.

Figure 10:
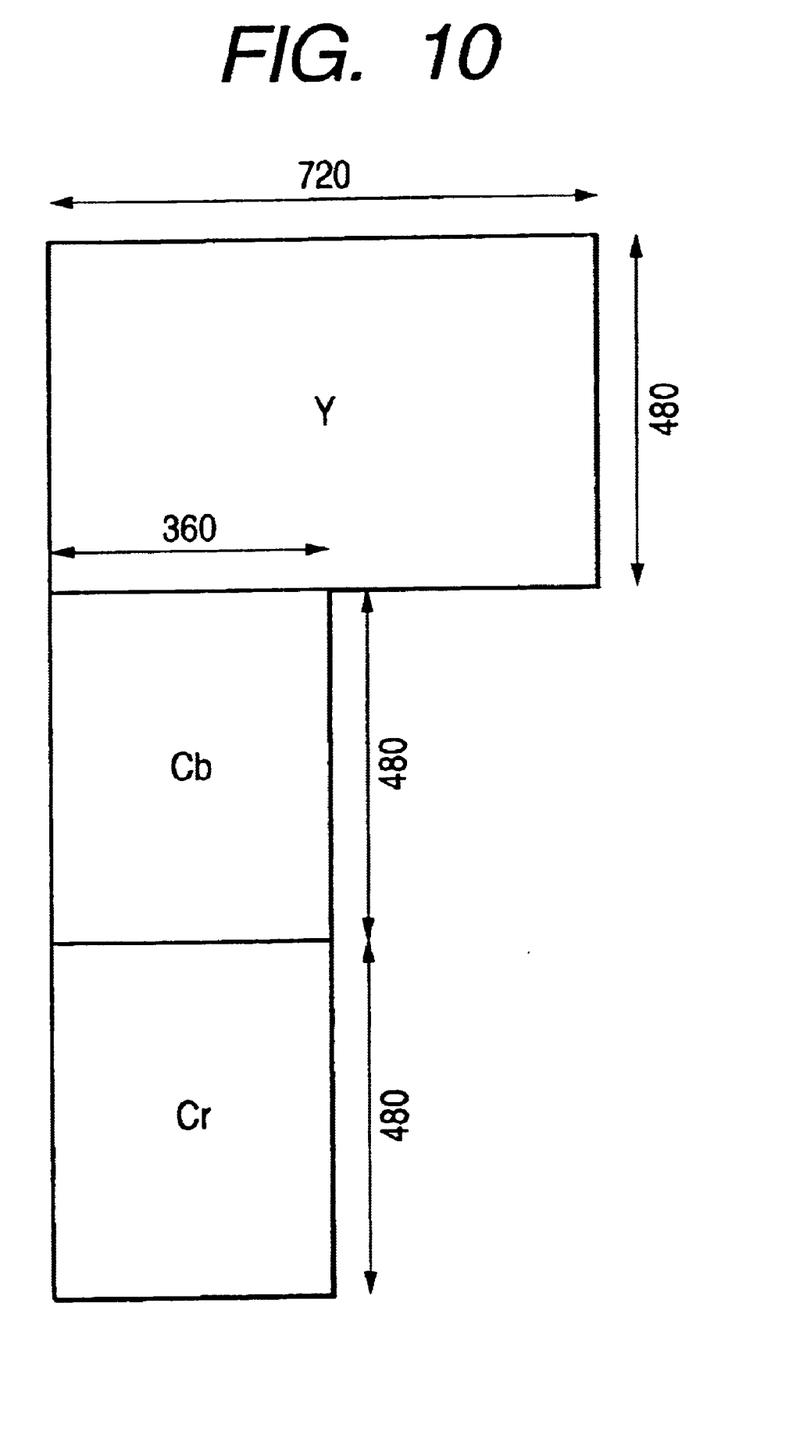
FIG. 10 is a diagram of the structure of picture data for one frame.

In the case where the original data are picture data, the original data are formed by a sequence of 8-bit samples which represent a luminance signal Y of 720 pixels in a horizontal direction and 480 lines in a vertical direction, and color difference signals Cb and Cr each of 360 pixels in a horizontal direction and 480 lines in a vertical direction for one frame as shown in FIG. 10.

According to a first example, the difference-value detector 1 calculates the values of the differences between samples of the original data which are separated at a predetermined interval.

According to a second example, the CPU 2 gives a desired interval to the interval deciding device 3. The interval deciding device 3 decides, on the basis of the desired interval, an interval related to calculation by the difference-value detector 1. The interval deciding device 3 informs the difference-value detector 1 of the decided interval. The difference-value detector 1 calculates the values of the differences between samples of the original data which are separated at an interval equal to the decided interval.

According to a third example, the difference-value detector 1 calculates the values of the differences between samples of the original data which are separated at an interval varied on the basis of a random-number table. The random-number table is possessed in common by the encoding side and the decoding side. In this case, it is possible to provide a high security for watermark information.

According to a fourth example, the difference-value detector 1 calculates the values of the differences between samples of the original data which are separated at an interval changed in units of given sample number or given time.

The difference-value detector 1 informs the difference-value converter 4 of the calculated inter-sample difference values. In addition, the difference-value detector 1 transmits the original data to the difference-value converter 4.

Information representing a watermark to be embedded is inputted into the characteristic-value converter 5. The characteristic-value converter 5 changes the watermark information into a corresponding difference value referred to as a forbidden difference value or a characteristic value. Specifically, different levels (different logic states) of watermark information are previously assigned to different difference values, respectively. According to this assignment, the characteristic-value converter 5 executes the change of the watermark information into the corresponding difference value. The characteristic-value converter 5 informs the difference-value converter 4 of the difference value (the watermark-related difference value, the forbidden difference value, or the characteristic value).

In the case where samples of the original data are separated into groups each having 1024 samples, the watermark information is preferably varied from sample group to sample group.

The difference-value converter 4 decides whether or not each of the inter-sample difference values fed from the difference-value detector 1 is equal to the watermark-related difference value. When the inter-sample difference value is equal to the watermark-related difference value, the difference-value converter 4 changes the inter-sample difference value to another value. Specifically, the difference-value converter 4 increments or decrements the value of the related sample of the original data by "1". The inter-sample difference value equal to the watermark-related difference value is referred to as the forbidden difference value.

In this way, the forbidden difference value is changed to another value by the difference-value converter 4. The value conversion by the difference-value converter 4 causes the watermark information to be embedded into the original data. The difference-value converter 4 outputs the resultant watermark-embedded data.

Figure 11:
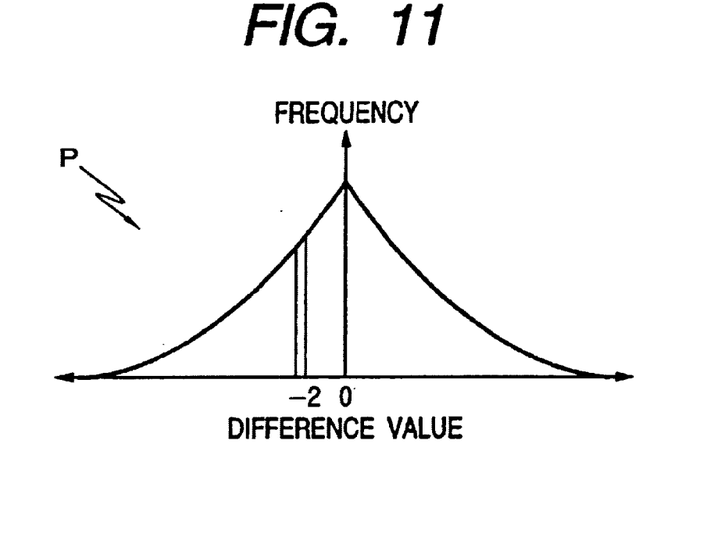
FIG. 11 is a diagram of an occurrence-frequency distribution of the values of the differences between data samples.

In the case of correlative data such as audio data or picture data in which adjacent samples tend to be resemblant to each other, the values of the differences between samples troop toward "0" as shown in FIG. 11. The probability density function of the values of the differences between samples of actual audio data, or the probability density function of the values of the differences between horizontally-separated or vertically-separated samples of actual picture data corresponds to a Laplace distribution "P" such as shown in FIG. 11. The Laplace distribution "P" is expressed as follows:

$$P(d)=1/(\sqrt{2}\sigma)\cdot\exp(-\sqrt{2}|d|/\sigma) \tag{1}$$

where "d" denotes an inter-sample difference value, and "σ" denotes the standard deviation. According to the Laplace distribution "P", the probability density decreases exponentially as the inter-sample difference value "d" increases or decreases from "0".

With reference to FIG. 11, in the case where the inter-sample differencl value "−2" is inhibited from occurring in the Laplace distribution "P", that is, in the case where the forbidden difference value is set to "−2", the watermark information corresponding to the difference value "−2" is embedded into the original data.

Fourth Embodiment

Figure 12:
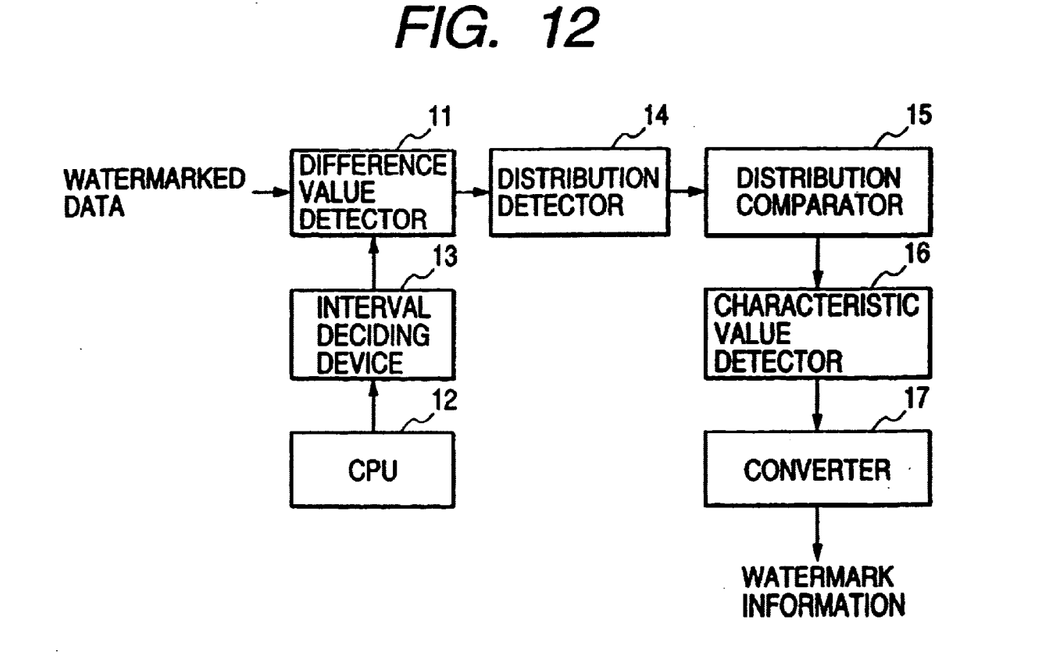
FIG. 12 is a block diagram of a watermark extracting apparatus according to a fourth embodiment of this invention.

FIG. 12 shows a watermark extracting apparatus according to a fourth, embodiment of this invention. The apparatus in FIG. 12 includes a difference value detector 11, a CPU 12, an interval deciding device 13, a distribution detector 14, a distribution comparator 15, a characteristic-value detector 16, and a converter 17. The difference-value detector 11 is connected to the distribution detector 14. The distribution detector 14 is connected to the distribution comparator 15. The distribution comparator 15 is connected to the characteristic-value detector 16. The characteristic-value detector 16 is connected to the converter 17. The CPU 12 is connected to the interval deciding device 13. The interval deciding device 13 is connected to the difference-value detector 11.

The apparatus in FIG. 12 receives watermark-embedded data (watermarked data) generated by the apparatus in FIG. 8. Specifically, the watermark-embedded data are inputted into the difference-value detector 11. The watermark-embedded data are formed by a sequence of samples.

According to a first example, the difference-value detector 11 calculates the values of the differences between samples of the watermark-embedded data which are separated at a predetermined interval.

According to a second example, the CPU 12 gives a desired interval to the interval deciding device 13. The interval deciding device 13 decides, on the basis of the desired interval, an interval related to calculation by the difference-value detector 11. The interval deciding device 13 informs the difference-value detector 11 of the decided interval. The difference-value detector 11 calculates the values of the differences between samples of the watermark-embedded data which are separated at an interval equal to the decided interval.

According to a third example, the difference-value detector 11 calculates the values of the differences between samples of the watermark-embedded data which are separated at an interval varied on the basis of a random-number table. The random-number table is possessed in common by the encoding side and the decoding side. In this case, it is possible to provide a high security for watermark information. It is necessary to match the phase of the decoding side with the phase of the encoding side. Accordingly, the data processing scheme is designed so that a unique pattern will appear in difference values when phase matching is established.

A fourth example is designed to provide good resistance to data processing for picture rotation. The fourth example considers the fact that a vector between successive samples varies. According to the fourth example, the difference-value detector 11 varies a vector value, and simultaneously calculates the values of the differences between samples of the watermark-embedded data while using a vector, with which the previously-mentioned unique pattern appears most noticeably, as a reference.

According to a fifth example, the difference-value detector 11 calculates the values of the differences between samples of the watermark-embedded data which are separated at an interval changed in units of given sample number or given time.

The difference-value detector 11 informs the distribution detector 14 of the calculated inter-sample difference values.

The distribution detector 14 handles the calculated inter sample difference values for every group of 1024 samples. The distribution detector 14 calculates a normalized occurrence-frequency distribution of the inter-sample difference values. The distribution detector 14 informs the distribution comparator 15 of the calculated occurrence-frequency distribution.

The distribution comparator 15 compares the calculated occurrence-frequency distribution with a general Laplace distribution given by the previously-indicated equation (1). Specifically, the distribution comparator 15 derives the occurrence frequency of a difference value "0" from the calculated occurrence-frequency distribution. Then, the distribution comparator 15 uses the derived occurrence frequency of the difference value "0" and the previously-indicated equation (1), thereby producing the general Laplace distribution. Subsequently, the distribution comparator 15 calculates the occurrence frequencies of respective difference values from the general Laplace distribution in a limited range which corresponds to the variable range of the level of the watermark information. In addition, the comparator 15 calculates the occurrence frequencies of respective difference values from the calculated occurrence-frequency distribution in the limited range. Then, the distribution comparator 15 compares the calculated occurrence frequencies based on the calculated occurrence-frequency distribution with the corresponding calculated occurrence frequencies based on the general Laplace distribution, respectively. The distribution comparator 15 informs the characteristic-value detector 16 of the comparison results.

The characteristic-value detector 16 decides whether or not each of the calculated occurrence frequencies based on the calculated occurrence frequency distribution is in a ±28% range centered at the corresponding calculated occurrence frequency based on the general Laplace distribution. Thus, the characteristic-value detector 16 decides whether each of the calculated occurrence frequencies based on the calculated occurrence frequency distribution is extremely greater than, extremely smaller than, or comparable with the corresponding calculated occurrence frequency based on the general Laplace distribution. The characteristic-value detector 16 detects the characteristic value (the forbidden difference value) in accordance with the results of the decision.

The characteristic-value detector 16 informs the converter 17 of the detected characteristic value. The converter 17 changes the detected characteristic value into a corresponding watermark-information level. The converter 17 generates watermark information in accordance with the watermark-information level. The converter 17 outputs the generated watermark information.

It is possible to accurately recover (reproduce) the watermark information from only a part of the watermark-embedded data. Even in the case where the watermark-embedded data are picture data and are processed to slightly rotate or distort a picture before the data are inputted into the apparatus of FIG. 12, the watermark information can be accurately recovered from the inputted data.

Fifth Embodiment

A fifth embodiment of this invention is similar to the third embodiment thereof except for design changes mentioned hereinafter. In the fifth embodiment of this invention, original data do not contain samples having values "+4" and "−4". Thus, regarding the original data, difference values "+4" and "−4" tend to occur at low frequencies. In a decoding side, difference values "+4" and "−4" might be erroneously detected as watermark-related difference values. To prevent such a problem, samples having values "+2" and "−2" are previously added to the original data as random noise. Thus, regarding the noise-added data, difference values "+4" and "−4" occur at substantially normal frequencies.

Sixth Embodiment

A sixth embodiment of this invention is similar to the third embodiment thereof except for design changes mentioned hereinafter. In the sixth embodiment of this invention, original data are picture data having a sequence of 8-bit samples. The picture data are luminance data or color-difference data. Every sample of the picture data takes any one of values "0" to "255".

In the case where watermark information has 3 bits, eight different levels (eight different logic states) of the watermark information are assigned to eight different values selected from among all possible levels of a picture-data sample as follows. The first level of the watermark information is assigned to a sample value "78". The second level of the watermark information is assigned to a sample value "88". The third level of the watermark information is assigned to a sample value "98". The fourth level of the watermark information is assigned to a sample value "118". The fifth level of the watermark information is assigned to a sample value "128". The sixth level of the watermark information is assigned to a sample value "138". The seventh level of the watermark information is assigned to a sample value "148". The eighth level of the watermark information is assigned to a sample value "158".

According to this assignment, the watermark information is converted into a corresponding sample value referred to as a characteristic value or a forbidden value. The picture data are processed so that the values of samples will not take the forbidden value (the characteristic value).

Figure 13:
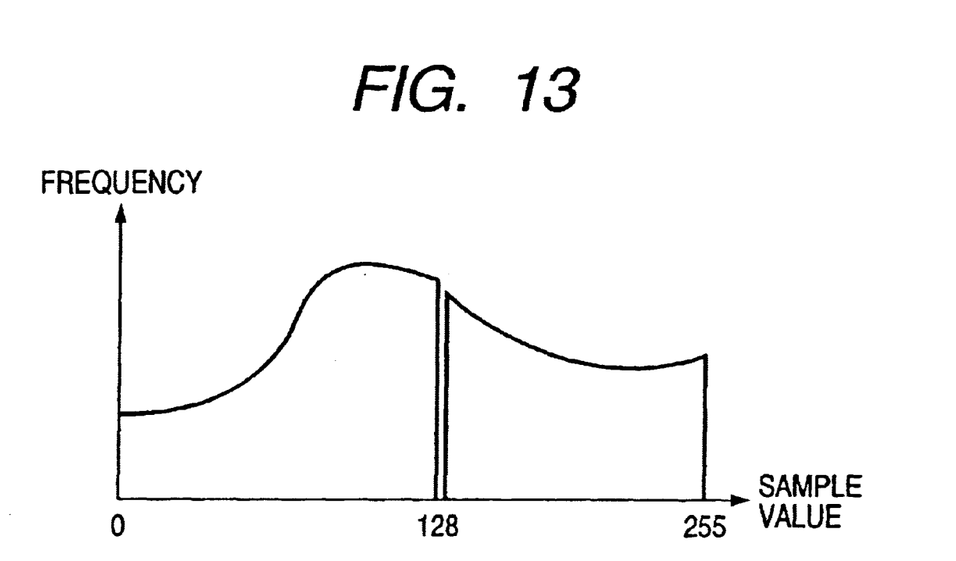
FIG. 13 is a diagram of an example of the occurrence-frequency distribution of sample values.

FIG. 13 shows an example of the occurrence-frequency distribution of sample values in the processing-resultant picture data. In FIG. 13, the sample value "128" is used as a characteristic value (a forbidden value) related to the watermark information.

Seventh Embodiment

A seventh embodiment of this invention is similar to the fourth embodiment thereof except for design changes mentioned hereinafter. In the seventh embodiment of this invention, 1024 successive samples of watermark-embedded data compose a window. Each time the sample of interest is shifted from one to another, the window is slid by one sample.

Figure 14:
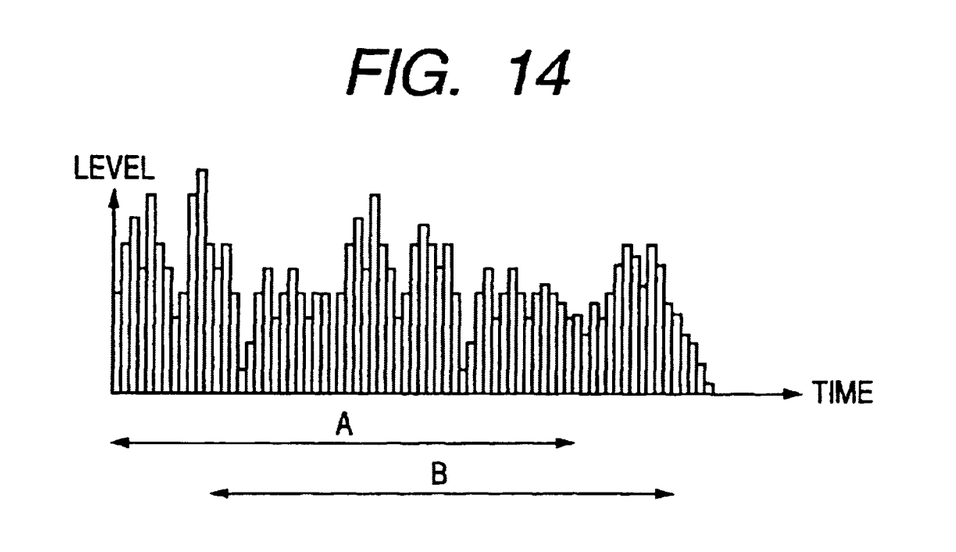
FIG. 14 is a time-domain diagram of an example of the levels represented by successive data samples.

With reference to FIG. 14, an occurrence-frequency distribution over the window is calculated and a variation in the occurrence-frequency distribution is observed while the window is slid, for example, from the position "A" to the position "B". The occurrence frequency of a characteristic value related to watermark information drops to zero at a certain moment, and then increases as the window is slid. For next 1024 successive samples, the occurrence frequency of the characteristic value gradually decreases. Such a variation in the occurrence frequency of the characteristic value can be detected. Therefore, it is easy to detect the watermark information even if the data starting position is unknown.

Figure 15:
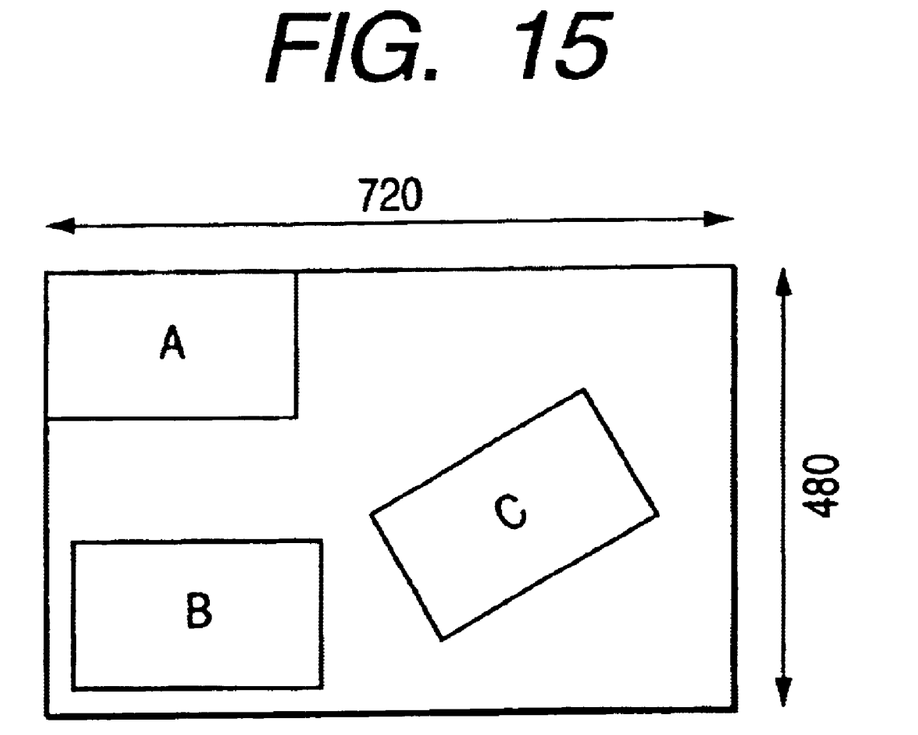
FIG. 15 is a diagram of a frame, and zones cut out therefrom.

In the case where the watermark-embedded data are picture data, watermark information can be detected from only a portion cut out from the watermark-embedded data. With reference to FIG. 15, the cutout portion corresponds to a rectangular corner zone "AA", an arbitrarily-positioned rectangular zone "BB", or a rectangular zone "CC" inclined at an angle of 30 degrees in a frame.

What is claimed is:

1. A method of inserting watermark information into digital data, comprising the steps of:

determining a specified data value in response to the watermark information; and changing a data-value occurrence-frequency distribution of a predetermined number of samples of the digital data into a modified occurrence-frequency distribution in which the specified data value occurs at a frequency extremely different from frequencies of occurrence of data values other than the specified data value.

2. A method of inserting watermark information into digital data, comprising the steps of:

calculating differences between samples of the digital data to generate difference data representing the calculated differences;

determining a specified difference data value in response to the watermark information; and changing a data-value occurrence-frequency distribution of a predetermined number of samples of the difference data into a modified occurrence-frequency distribution in which the specified difference data value occurs at a frequency extremely different from frequencies of occurrence of difference data values other than the specified difference data value.

3. A method of inserting watermark information into digital data, comprising the steps of:

calculating differences between samples of the digital data to generate difference data representing the calculated differences;

determining a specified difference data value in response to the watermark information; and changing a normalized data-value occurrence-frequency Laplace distribution of a predetermined number of samples of the difference data into a modified occurrence-frequency distribution in which the specified difference data value occurs at a frequency extremely different from frequencies of occurrence of difference data values other than the specified difference data value.

4. A method of extracting watermark information from digital data, comprising the steps of:

detecting an occurrence-frequency distribution of data values in a predetermined number of samples of the digital data;

detecting, from the detected occurrence-frequency distribution, a data value which occurs at a frequency extremely different from frequencies of occurrence of other data values; and reproducing the watermark information on the basis of the detected data value.

5. A method of extracting watermark information from digital data, comprising the steps of:

calculating differences between samples of the digital data to generate difference data representing the calculated differences;

detecting an occurrence-frequency distribution of difference data values in a predetermined number of samples of the difference data;

detecting, from the detected occurrence-frequency distribution, a difference data value which occurs at a frequency extremely different from frequencies of occurrence of other difference data values; and reproducing the watermark information on the basis of the detected difference data value.

6. A method of extracting watermark information from digital data, comprising the steps of:

calculating differences between samples of the digital data to generate difference data representing the calculated differences;

detecting a normalized occurrence-frequency Laplace distribution of difference data values in a predetermined number of samples of the difference data;

detecting, from the detected normalized occurrence-frequency Laplace distribution, a difference data value which occurs at a frequency extremely different from frequencies of occurrence of other difference data values; and reproducing the watermark information on the basis of the detected difference data value.

7. An apparatus for inserting watermark information into digital data, comprising:

means for determining a specified data value in response to the watermark information; and means for changing a data-value occurrence-frequency distribution of a predetermined number of samples of the digital data into a modified occurrence-frequency distribution in which the specified data value occurs at a frequency extremely different from frequencies of occurrence of data values other than the specified data value.

8. An apparatus for inserting watermark information into digital data, comprising:

means for calculating differences between samples of the digital data to generate difference data representing the calculated differences;

means for determining a specified difference data value in response to the watermark information; and     means for changing a data-value occurrence-frequency distribution of a predetermined number of samples of the difference data into a modified occurrence-frequency distribution in which the specified difference data value occurs at a frequency extremely different from frequencies of occurrence of difference data values other than the specified difference data value.

9. An apparatus for inserting watermark information into digital data, comprising:

means for calculating differences between samples of the digital data to generate difference data representing the calculated differences;

means for determining a specified difference data value in response to the watermark information; and     means for changing a normalized data-value occurrence-frequency Laplace distribution of a predetermined number of samples of the difference data into a modified occurrence-frequency distribution in which the specified difference data value occurs at a frequency extremely different from frequencies of occurrence of difference data values other than the specified difference data value.

10. An apparatus for extracting watermark information from digital data, comprising:

means for detecting an occurrence-frequency distribution of data values in a predetermined number of samples of the digital data;

means for detecting, from the detected occurrence-frequency distribution, a data value which occurs at a frequency extremely different from frequencies of occurrence of other data values; and     means for reproducing the watermark information on the basis of the detected data value.

11. An apparatus for extracting watermark information from digital data, comprising:

means for calculating differences between samples of the digital data to generate difference data representing the calculated differences;

means for detecting an occurrence-frequency distribution of difference data values in a predetermined number of samples of the difference data;

means for detecting, from the detected occurrence-frequency distribution, a difference data value which occurs at a frequency extremely different from frequencies of occurrence of other difference data values; and     means for reproducing the watermark information on the basis of the detected difference data value.

12. An apparatus for extracting watermark information from digital data, comprising:

means for calculating differences between samples of the digital data to generate difference data representing the calculated differences;

means for detecting a normalized occurrence-frequency Laplace distribution of difference data values in a predetermined number of samples of the difference data;

means for detecting, from the detected normalized occurrence-frequency Laplace distribution, a difference data value which occurs at a frequency extremely different from frequencies of occurrence of other difference data values; and     means for reproducing the watermark information on the basis of the detected difference data value.

13. An apparatus for inserting watermark information into digital data, comprising:

means for deriving differences between samples of the digital data;

means for selecting at least one from among values, which differences between samples of the digital data can take, as a forbidden value in response to the watermark information;

means for deciding whether or not the derived differences are equal to the forbidden value; and     means for changing logic states of samples of the digital data which relate to the derived differences decided to be equal to the forbidden value to convert the digital data into conversion-resultant data to inhibit differences between samples of the conversion-resultant data from taking the forbidden value.

14. An apparatus for extracting watermark information from digital data, comprising:

means for deriving differences between samples of the digital data;

means for detecting an occurrence-frequency distribution of values of the derived differences;

means for comparing the detected occurrence-frequency distribution with a predetermined reference occurrence-frequency distribution to find a difference value whose detected occurrence frequency is smaller than its reference occurrence frequency by more than a given percentage; and     means for reproducing the watermark information on the basis of the found difference value.

\* \* \* \* \*